(12) United States Patent
Cosgun (10) Patent No.: US 7,717,698 B2
(45) Date of Patent: May 18, 2010

(54) PLASTICIZING AND INJECTION DEVICE

(75) Inventor: Dudu Cosgun, Oyonnax (FR)

(73) Assignee: Billion S.A.S., Oyonnax (FR)

( * ) Notice: Subject to any disclaimer, the term of this patent is extended or adjusted under 35 U.S.C. 154(b) by 29 days.

(21) Appl. No.: 11/577,538

(22) PCT Filed: Oct. 18, 2005

(86) PCT No.: PCT/EP2005/055339

§ 371 (c)(1),
(2), (4) Date: Jan. 21, 2009

(87) PCT Pub. No.: WO2006/042849

PCT Pub. Date: Apr. 27, 2006

(65) Prior Publication Data

US 2009/0186115 A1     Jul. 23, 2009

(30) Foreign Application Priority Data

Oct. 19, 2004 (DE) .................. 10 2004 051 105

(51) Int. Cl.
*B29C 45/54* (2006.01)
(52) U.S. Cl. ................. 425/558; 425/559; 425/561
(58) Field of Classification Search .......... 425/557–562
See application file for complete search history.

(56) References Cited

U.S. PATENT DOCUMENTS

| | | | | |
|---|---|---|---|---|
| 3,319,299 A * | 5/1967 | Kiraly | | 366/77 |
| 3,888,393 A | 6/1975 | Drori | | |
| 4,850,851 A * | 7/1989 | Dinerman | | 425/562 |
| 4,966,539 A * | 10/1990 | Pena | | 425/208 |
| 5,044,926 A * | 9/1991 | Dinerman et al. | | 425/562 |
| 5,112,213 A * | 5/1992 | Oas | | 425/562 |
| 5,518,394 A * | 5/1996 | Shiozawa et al. | | 425/562 |
| 6,499,987 B1 * | 12/2002 | Durina et al. | | 425/192 R |
| 6,551,093 B2 * | 4/2003 | Taha | | 425/556 |
| 6,554,603 B1 * | 4/2003 | Schreiner et al. | | 425/559 |
| 6,652,254 B2 * | 11/2003 | Shimura et al. | | 425/4 R |
| 6,824,374 B1 * | 11/2004 | Seta et al. | | 425/145 |

(Continued)

FOREIGN PATENT DOCUMENTS

DE     1 084 475     6/1960

(Continued)

*Primary Examiner*—Yogendra N Gupta
*Assistant Examiner*—Emmanuel S Luk
(74) *Attorney, Agent, or Firm*—Henry M. Feiereisen; Ursula B. Day (57) ABSTRACT

A plasticizing and injecting device for a plastics injection molding machine includes an axially fixed and rotationally driven plasticizing screw, and an injection plunger movable forwards and backwards inside the plasticizing screw by a linear drive and including, at its front end, a non-return valve. An injection cylinder is provided anteriorly of the plasticizing cylinder. The non-return valve can be moved by the injection cylinder forwards and backwards inside the injection cylinder between a rear position at the beginning of the injection process and a front position after completion of the injection process. In addition, a melt chamber is formed between the front end of the plasticizing screw and the non-return valve, and forms, during the injection process and during the holding pressure phase, an annular gap between the injection plunger and the injection cylinder for receiving plastic melt as the plasticizing screw continues to rotate during injection.

16 Claims, 8 Drawing Sheets

U.S. PATENT DOCUMENTS

| | | | |
|---|---|---|---|
| 6,857,867 B2 * | 2/2005 | Schimmel | 425/559 |
| 7,252,500 B2 * | 8/2007 | Gill et al. | 425/559 |

FOREIGN PATENT DOCUMENTS

| | | |
|---|---|---|
| DE | 1 105 153 | 4/1961 |
| DE | 1 778 125 | 7/1971 |
| DE | 2 159 056 | 6/1973 |
| DE | 44 01 026 | 7/1995 |
| DE | 44 31 264 | 3/1996 |
| DE | 198 28 770 | 12/1999 |
| DE | 10345609 | 12/2004 |
| EP | 0 729 821 | 9/1996 |
| GB | 1 015 092 | 12/1965 |
| JP | 60031936 | 2/1985 |
| JP | 02164511 | 6/1990 |
| JP | 03197017 | 8/1991 |
| JP | 04022613 | 1/1992 |
| JP | 07195411 | 8/1995 |
| JP | 407290533 A * | 11/1995 |
| JP | 409220743 A * | 8/1997 |
| JP | 09314624 | 12/1997 |
| JP | 0200000860 A * | 1/2000 |
| WO | WO 86/06321 | 11/1986 |
| WO | WO2004/106030 | 12/2004 |

* cited by examiner

PLASTICIZING AND INJECTION DEVICE

BACKGROUND OF THE INVENTION

The invention relates to a plasticizing and injection device for a plastics processing machine.

Injection molding machines are known having a so-called reciprocating screw for jointly execute the function plasticizing and injection. The screw is caused to rotate in order to melt and transport the plastic. Furthermore, the screw is movable axially for injecting the plastic melt into a mold and has a non-return valve at its leading end. Such a plasticizing and injection device is characterized by its simplicity and its versatility with respect to different applications. A drawback of such a plasticizing and injection device is foremost the adverse effect on the homogeneity of the melt as a result of the rearward movement of the screw during plasticizing because of the absence of a constant screw length for plasticizing and homogenizing the plastic pellets within a cycle. Moreover, the screw is idle during injection and holding pressure phase, thereby adversely affecting the cycle time. Further disadvantageous is the balance that must be struck between plasticizing capacity, on one hand, and injection pressure, on the other hand, for dimensioning of the screw.

To address the afore-mentioned drawbacks, proposals have been made for so-called injection molding compounders to provide a continuously operating twin-screw extruder and downstream thereof one or more injection plunger and cylinder units (DE 19828770 A1, WO 86/06321 A1).

German publication DE 1105153 further discloses an injection molding machine which also provides a functional split between plasticizing, on one hand, and injection, on the other hand. This document discloses a plasticizing and injection device having a plasticizing cylinder which accommodates a rotatable plasticizing screw, a melt chamber anteriorly of the plasticizing screw for receiving and temporary storage of plastic melt, and an injection cylinder downstream of the melt chamber. The injection cylinder can be moved through displacement of the entire clamping unit against the injection cylinder and then moved as unit against a stationary injection plunger to transfer plastic melt into the closed injection mold. The melt chamber is defined on the opposite side of the injection plunger by a recess in the injection plunger, on one hand, and by an extension piece on the plasticizing cylinder, on the other hand. The plasticizing cylinder can be moved back and forth in relation to the stationary injection plunger by means of plunger and cylinder units in order to be able to fill the melt chamber, on one hand, and to displace plastic melt from the melt chamber into the injection cylinder, on the other hand. A channel extends in the stationary injection plunger for connecting the melt chamber with the injection cylinder and is blocked by a ball check valve during injection to prevent backflow of melt. A drawback is, on one hand, the comparably great diameter of the injection plunger, which adversely affects a precise metering of the shot volume. Heating of the melt chamber and injection cylinder has also being shown relatively difficult because the chambers, bounded by the stationary injection plunger, are temporarily exposed and temporarily plunge into a housing. Also the overall construction appears complex and cumbersome as the entire clamping unit has to be moved for operating the injection cylinder.

DE 4401026 discloses a further plasticizing and injection device to provide a functional split between plasticizing, on one hand, and injection, on the other hand. This device includes a plasticizing cylinder with a rotating plasticizing screw and an injection plunger axially movable in the plasticizing screw. The injection plunger is realized in the form of a piston rod with a non-return valve. Provided inside the plasticizing screw is an accumulator chamber for plastic melt which chamber is subdivided by the non-return valve into two separate accumulator chambers of a volume which is dependent on the position of the non-return valve. Both accumulator chambers communicate with the plasticizing space via melt channels in the plasticizing screw. Plastic melt flows via these channels during the plasticizing process to the front and/or rear accumulator chamber in dependence on the position of the injection plunger. After both accumulator chambers have been filled, the injection plunger moves backwards and plastic melt is displaced from the rear accumulator chamber through the open non-return valve to the front accumulator chamber. The injection plunger is moved forwards to inject into an injection mold, without interrupting the rotation of the plasticizing screw. A drawback is hereby the required high energy consumption for heating the accumulator chamber inside the plasticizing screw since heat has to penetrate through the entire thickness of the plasticizing screw. Moreover, an uncontrolled backflow of plastic melt through the melt channels into the screw flights during the injection process. As a result, it becomes difficult to precisely and reproducibly realize the shot volume. Furthermore, problems may be encountered when closing the non-return valve because, as a result of the backflow of plastic melt into the screw flights, the pressure buildup may be inadequate upstream of the non-return valve to enable a complete closing of the non-return valve.

GB-A-1015092 discloses a plasticizing and injection device which also describes a functional split between plasticizing, on one hand, and injection, on the other hand. A rotatable plasticizing screw is arranged in a plasticizing cylinder in an axially immovable manner and an injection cylinder is provided upstream of the plasticizing cylinder. An injection plunger made of two separate parts is situated inside the plasticizing screw, with the rear part extending out of the screw and movable linearly in injection direction by a single-action piston and cylinder assembly. The front part projects forwardly beyond the screw and includes a headpiece with channels in which ball check vales are disposed. Both parts impact one another inside the screw. At metering, plastic melt is advanced forwardly through a very narrow gap between the injection plunger and the injection cylinder and through channels extending in the head of the injection plunger to the space anteriorly of the injection plunger. As pressure builds up, the forward part of the injection plunger is moved backwards and thus also the abutting rear part of the injection plunger. As soon as the required amount of plastic melt is realized and the injection plunger assumes its initial position for the injection process, the rotary drive of the screw is switch off and melt production is stopped. This is necessary insofar as no melt chamber is available which could accept and temporarily store plastic melt during the injection process and possibly also during the holding pressure phase. If the plasticizing screw were to continue to operate, significant pressure would buildup behind the ball check valves and generate a force upon the injection plunger in opposition to the injection direction. This known plasticizing and injection device is thus hardly suitable for short cycle times. In addition, there is a significant risk of unwanted heating of the plastic melt in the very narrow gap between injection plunger and injection cylinder, possibly causing decomposition. As the injection plunger can be operated only in injection direction, there is no option to effect a momentary pressure relief in the melt immediately before injection through a slight backward stroke, a fact that is oftentimes considered beneficial.

German publication DE 1084474 discloses a plasticizing and injection device of a type involved here for a plastics processing machine, having a rotatable plasticizing screw, disposed axially immovable in a plasticizing cylinder, and an injection plunger, arranged in the plasticizing screw and axially movable back and forth by means of a linear drive, with the injection plunger having a non-return valve and with an injection cylinder being provided upstream of the plasticizing cylinder. The plasticizing screw does not completely fill the plasticizing cylinder; rather the forward end of the plasticizing screw is situated offset to the rear in relation to the forward end of the plasticizing cylinder in order to form an antechamber for accepting and temporarily store plastic melt. This antechamber is sized large enough to accept at a distance to its walls the entire injection plunger, which has a diameter greater than the piston rod and is provided with the non-return valve, in the initial position for executing the injection process. As the injection plunger moves out of the injection cylinder during each injection process, implementation of a precise metering becomes difficult. Moreover, the transition from the antechamber to the injection cylinder can easily be damaged when the injection plunger slightly deviates from the injection axis for example. In addition, there are limitations as far as selection of useable non-return valves is concerned because the locking ring may not move out of the injection cylinder.

SUMMARY OF THE INVENTION

Starting herefrom, the invention is based on the object to provide a plasticizing and injection device which provides a functional split between plasticizing, on one hand, and injection, on the other hand but which obviates the afore-mentioned drawbacks. Further, the invention is based on the object to provide a plasticizing and injection device which is suitable for short cycle times and at the same time exhibits a high degree of metering accuracy.

This object is attained by a plasticizing and injection device for a plastics processing machine, which device includes a rotatably plasticizing screw arranged in a plasticizing cylinder in an axially immovable manner, and an injection plunger, which is arranged in the plasticizing screw and movable back and forth in relation to the latter by a linear drive and which includes a non-return valve at its forward end with an injection cylinder being provided anteriorly of the plasticizing cylinder, wherein the non-return valve is movable back and forth by means of the injection plunger to execute an injection process within the injection cylinder between a rearward position at the start of the injection process and a forward position after conclusion of the injection process, and wherein a melt chamber is formed between the forward end of the plasticizing screw and the non-return valve for formation of an annular gap between the injection plunger and the injection cylinder for accepting plastic melt during the injection process and during the holding pressure phase, while the plasticizing screw continues to rotate during injection.

As the non-return valve is movable back and forth between a rearward position at the start of the injection process and a forward position after conclusion of the injection process by the injection plunger to execute an injection process within the injection cylinder, a high degree of metering accuracy is realized. In addition, as a melt chamber is formed between the forward end of the plasticizing screw and the non-return valve for formation of an annular gap between the injection plunger and the injection cylinder for accepting plastic melt during the injection process and during the holding pressure phase, as the plasticizing screw continues to rotate during injection, short cycle times can be realized.

It is of particular advantage that the diameter of the plasticizing screw is sized to effect the desired plasticizing capacity, i.e. comparably great, and that, on the other hand, the diameter of the injection cylinder can be selected independently thereof comparably small in order to be able to attain a high injection pressure and a high accuracy in relation to the shot volume. Moreover, the plasticizing zone and the injection zone can be heated independently from one another. As a result, a high plasticizing capacity and a high metering accuracy can be combined while attaining short cycle times. In order to realize a high plasticizing capacity, suitably long plasticizing screws can further be provided, for example of a length of significantly above 10 $D_S$, wherein $D_S$ relates to the screw diameter. Tests have shown good results with lengths between 16 $D_S$ and 17 $D_S$. In addition, the plasticizing capacity can be increased through use of plasticizing screws with more than one screw flight (e.g. two or three) and/or use of so-called barrier screws which in turn may have more than one screw flight (e.g. two or more).

Through suitable adjustment of the annular gap between the injection plunger and the injection cylinder, it becomes possible to best suit the melt chamber to the application at hand. A significant annular gap not only provides enough space for acceptance and temporary storage of plastic melt but prevents also an undesired heating like in the GB-A-1015092.

BRIEF DESCRIPTION OF THE DRAWING

Exemplary embodiments of the invention will now be described in greater detail with reference to the figures, in which.

DETAILED DESCRIPTION OF PREFERRED EMBODIMENTS

An embodiment of the plasticizing and injection device according to the invention shall be described with reference to FIGS. 1 to 4. A plasticizing screw 8, which is caused to rotate by a drive 10 attached to a rear end thereof and is received axially immovable in a plasticizing cylinder 9, extends to the forward end of this plasticizing cylinder. To prevent dead zones, the forward end of the plasticizing screw 8 can be designed, as illustrated, conically in accordance with the immediately opposing forward end of the plasticizing cylinder 9. An injection plunger 3 is situated within a bore extending through the plasticizing screw 8, with a sliding and sealing sleeve 11 preventing a deposit of melt between the injection plunger 3 and the plasticizing screw 8. The injection plunger can be constructed in one piece, as illustrated. Optionally, several single pieces may be interconnected to form a common injection plunger. The injection plunger 3 projects beyond the rear end of the plasticizing screw 8 by a suitable piece and is connected there to a linear drive 1. In the present example, the linear drive 1 includes two hydraulic cylinders 4 and 5 which are arranged to the left and right of the plasticizing cylinder 9 and with which piston rods 16 and 17 can be operated. Both piston rods and the rear end of the injection plunger 3 are operatively connected to one another by a traverse bar 18. Moreover, the rear end of the injection plunger 3 is mounted in the traverse bar such that the injection plunger 3 does not rotate as the plasticizing screw 8 rotates. Optionally, only one hydraulic cylinder may be provided directly behind the rear end of the injection plunger 3 and have a piston rod which is connected directly to the rear end of the injection plunger 3. Provided anteriorly in prolongation of the plasticizing cylinder 9 are an injection cylinder 7 and a nozzle 6 which are firmly secured to one another by appropriate fastening means. The diameter D1 of the plasticizing cylinder 9 is considerably greater and the diameter D3 of the nozzle 6 is smaller than the diameter D2 of the injection cylinder 7. The change from D1 to D2 and from D2 to D3 is gradual through provision of suitable transition zones. The plasticizing cylinder 9 and the injection cylinder 7 can be configured as separate components, as illustrated; of course, it is also possible to configure the plasticizing cylinder and the injection cylinder in a single-piece cylinder. At its forward end, the injection plunger 3 has a non-return valve 2, in the present case an annular non-return valve, having a tip 2a, a locking ring 2b, a thrust ring 2c, and a shaft 2d threadably engaged in the injection plunger 3. Instead of the depicted annular non-return valve, any other type of non-return valve may be provided, for example a ball-type non-return valve, slotted-guide-type non-return valve, combination of annular and ball-type non-return valves or other configurations. Formed between the forward end of the plasticizing screw 8 and the non-return valve 2 is a melt chamber 13 into which the plastic melt can be conveyed and temporarily stored. Formed in the injection cylinder 7 anteriorly of the non-return valve 2 is an injection chamber 14. Not shown are known pressure pickups for measuring the pressure in the injection chamber 14 and/or in the melt chamber 13 in order to be able to control or regulate the rotary drive for the plasticizing screw in dependence on these pressure values.

Figure 1:
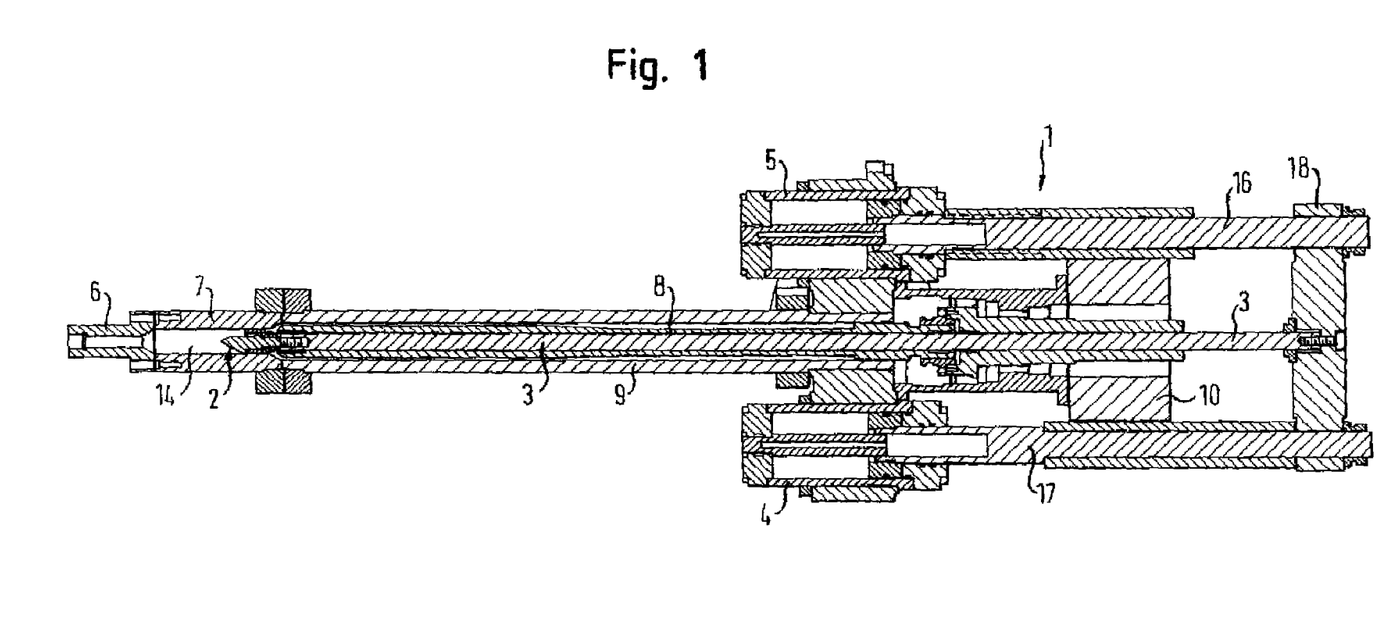
FIG. 1 shows a longitudinal section through a first embodiment of the invention in a state prior to injection (injection plunger in rearward position=starting position)
Figure 2:
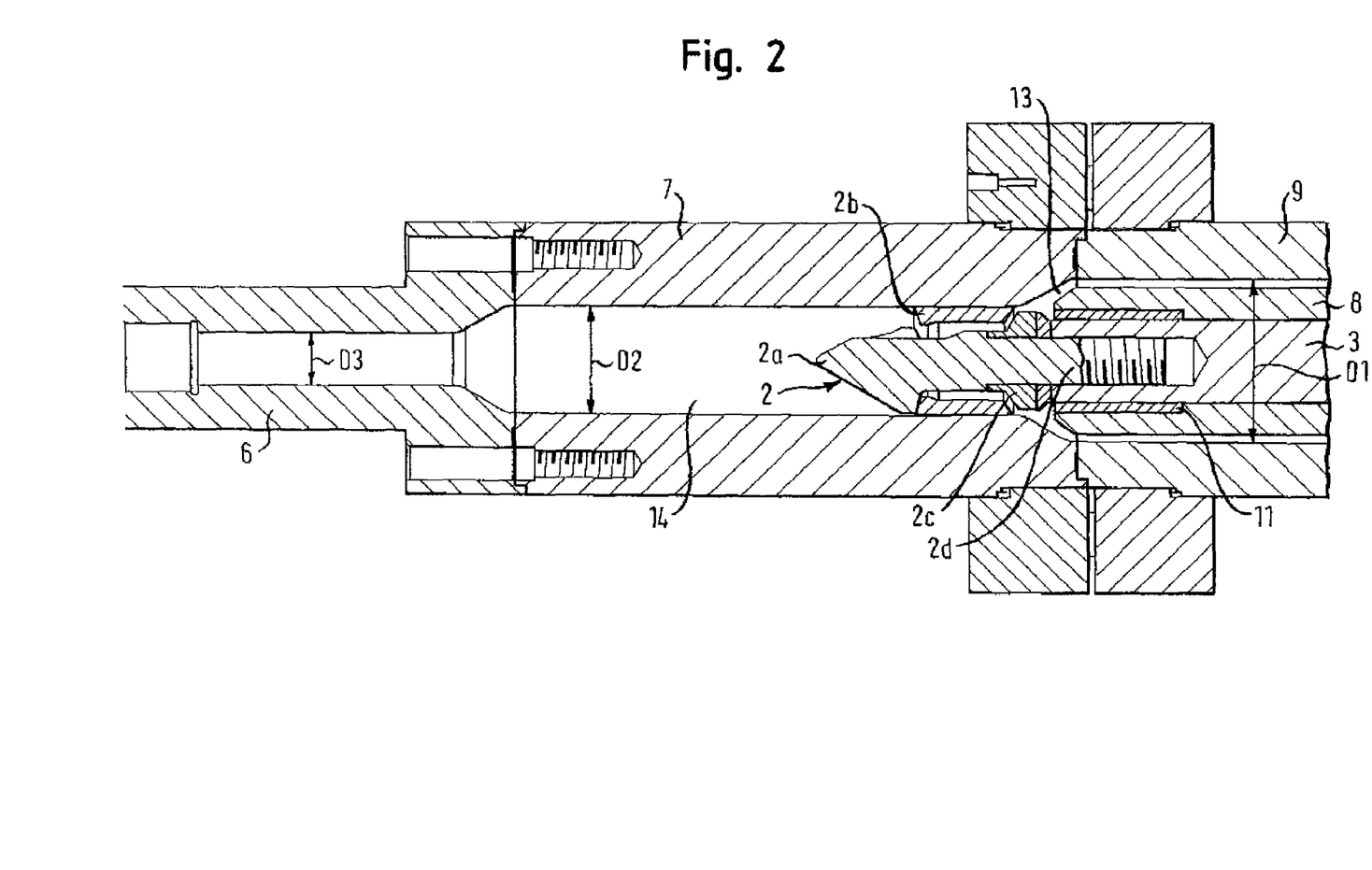
FIG. 2 shows a cutaway of FIG. 1 on an enlarged scale.
Figure 3:
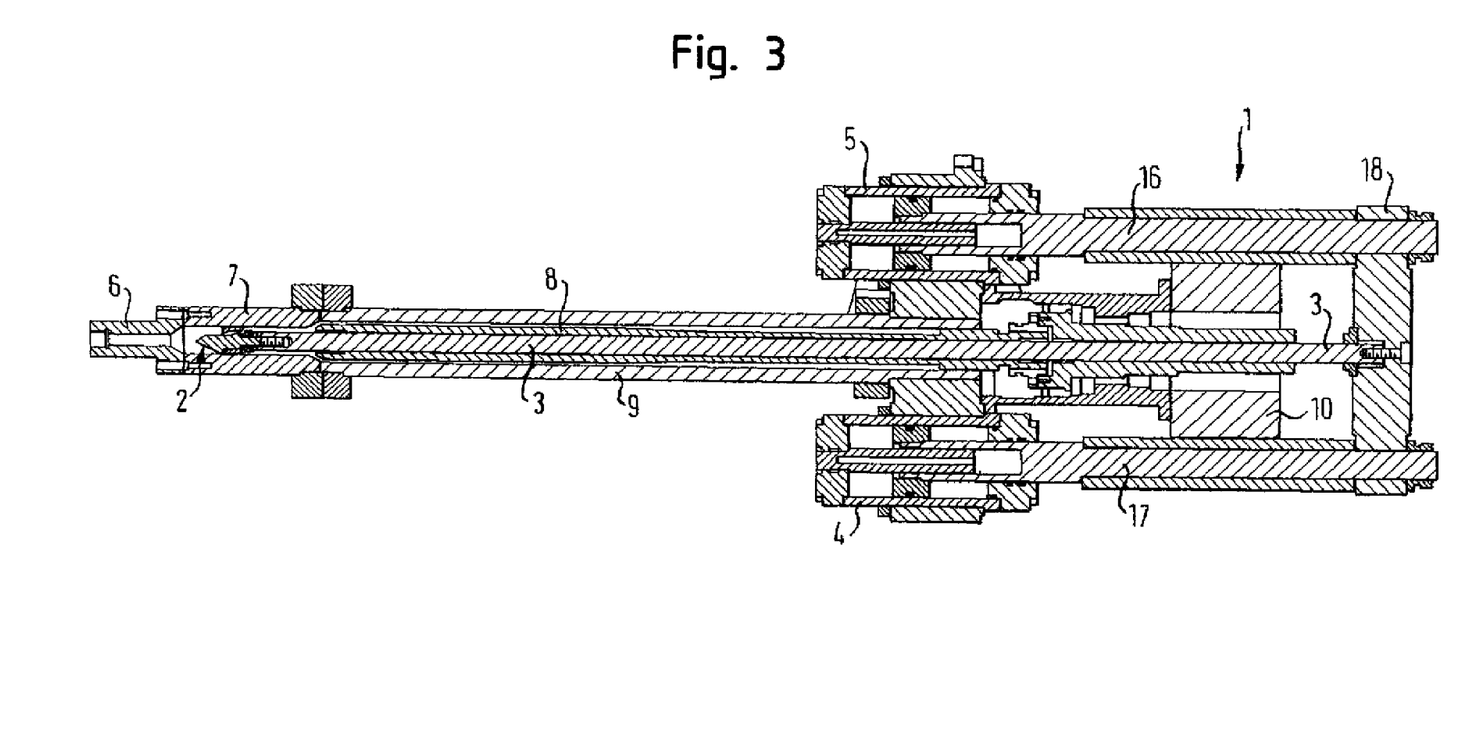
FIG. 3 shows a longitudinal section like in FIG. 1, however in a state after injection (injection plunger in forward position=end position)
Figure 4:
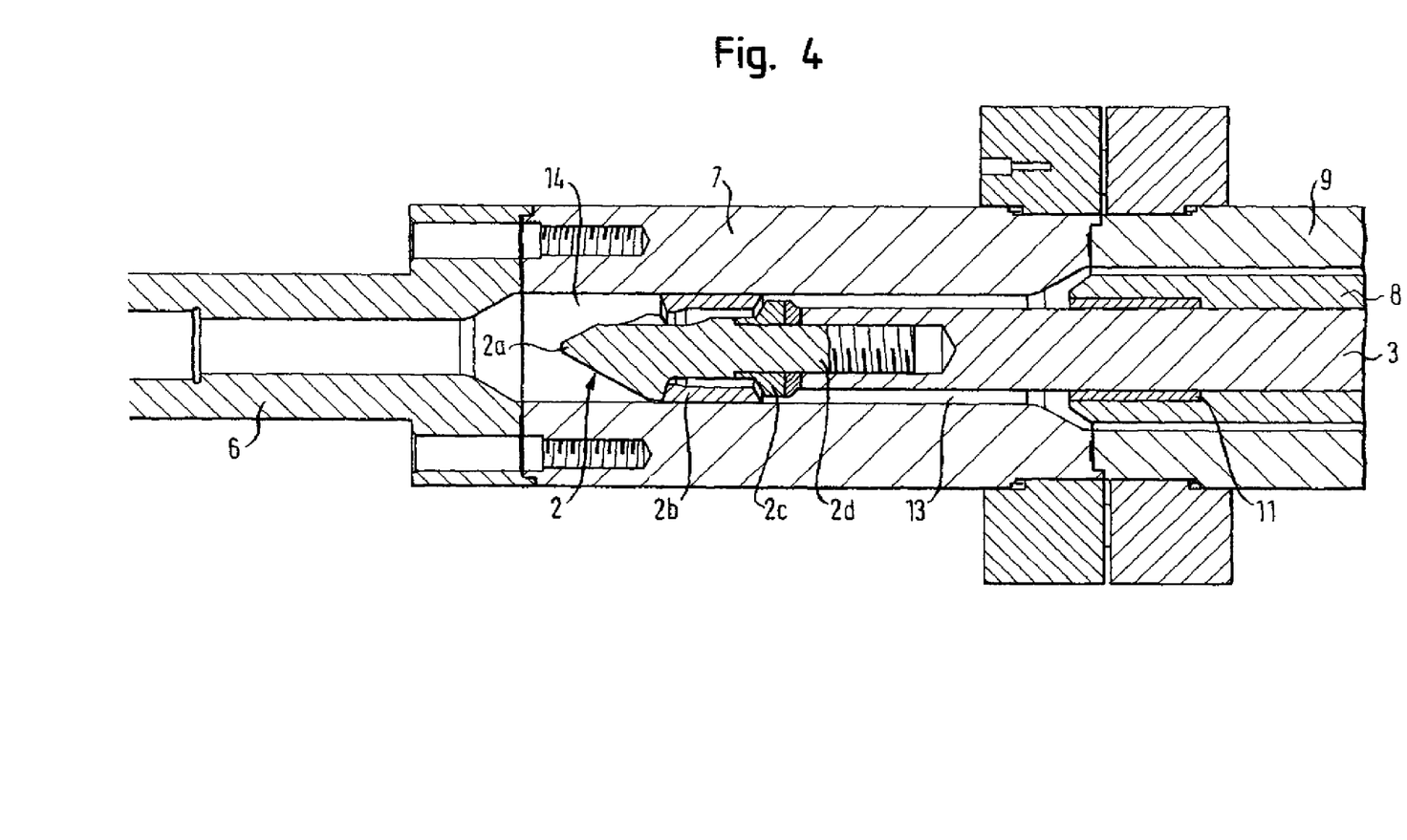
FIG. 4 shows a cutaway of FIG. 2 on an enlarged scale.

The injection molding cycle runs as follows:

At the start of the injection process, the injection plunger 3 is in its rearward position and the injection chamber 14 is filled with plastic melt (FIGS. 1 and 2). The linear drive 1 moves the injection plunger 3 forwardly. The non-return valve 2 closes as a result of the thus introduced pressure increase in the injection chamber 14 as the locking ring 2b and the thrust ring 2c impact one another in a known manner with their pressure surfaces so that the melt path is blocked and the plastic melt in the injection chamber 14 is injected by means of the closed non-return valve 2 into a mold not shown here. During this phase of injection and optionally also during the subsequent holding pressure phase, the plasticizing screw 8 continues to rotate in order to convey new plastic melt for the next injection stroke into the injection cylinder 7, that is through the annular-gap-shaped melt chamber 13, which is located downstream of the non-return valve 2 and has been emptied by the injection.

When the injection process and the subsequent holding pressure phase are over (FIGS. 3 and 4), the injection plunger 3 is moved back to its initial position. The rotation of the plasticizing screw 8 increasingly conveys plastic melt into the melt chamber 13. The thus accompanying pressure increase in the melt chamber 13 causes the non-return valve 2 to open as the locking ring 2b detaches from the thrust ring 2c in known manner as a result of the pressure increase. The melt path is thus cleared and the plastic melt delivered by the plasticizing screw 8 is able to flow from the melt chamber 13 through the open non-return valve 2 into the injection chamber 14. Plastic melt accumulating in the injection chamber 14 results in a pressure increase there to cause the injection plunger 3 to move backwards. The backward movement of the injection plunger 3 may be influenced, optionally, by means of the linear drive 1 (supportive or slowing down). When the injection chamber 14 has been filled with the desired volume of plastic melt, the rotation of the plasticizing screw 8 is briefly stopped and the injection plunger 3 is further moved backwards by a short distance by means of the linear drive 1 to effect a pressure relief in the plastic melt in the injection chamber 14 for a certain time. The non-return valve 2 now assumes again in the injection cylinder 7 its rearward position like at the start of the preceding injection process. Subsequently, the injection plunger 3 is moved forwards by means of the linear drive 1 and the cycle starts anew, i.e. the non-return valve 2 is moved again from its rear starting position to the forward end position. At the same time, the plasticizing screw 8 continues to convey plastic melt in order to fill the expanding melt chamber 12 or keep it tilled with new plastic melt.

In order to minimize or possibly prevent altogether potential decompression phenomena in the melt chamber 13 during the injection process, various measures can be provided.

For one, the rotation speed of the plasticizing screw 8 can be controlled in dependence on the injection speed and increased for example to a suitable level to increase the plasticizing capacity. Thus, a sufficiently large amount of plastic melt can be re-supplied in a relatively short time to maintain the melt chamber 13 filled with plastic melt.

Figure 5:
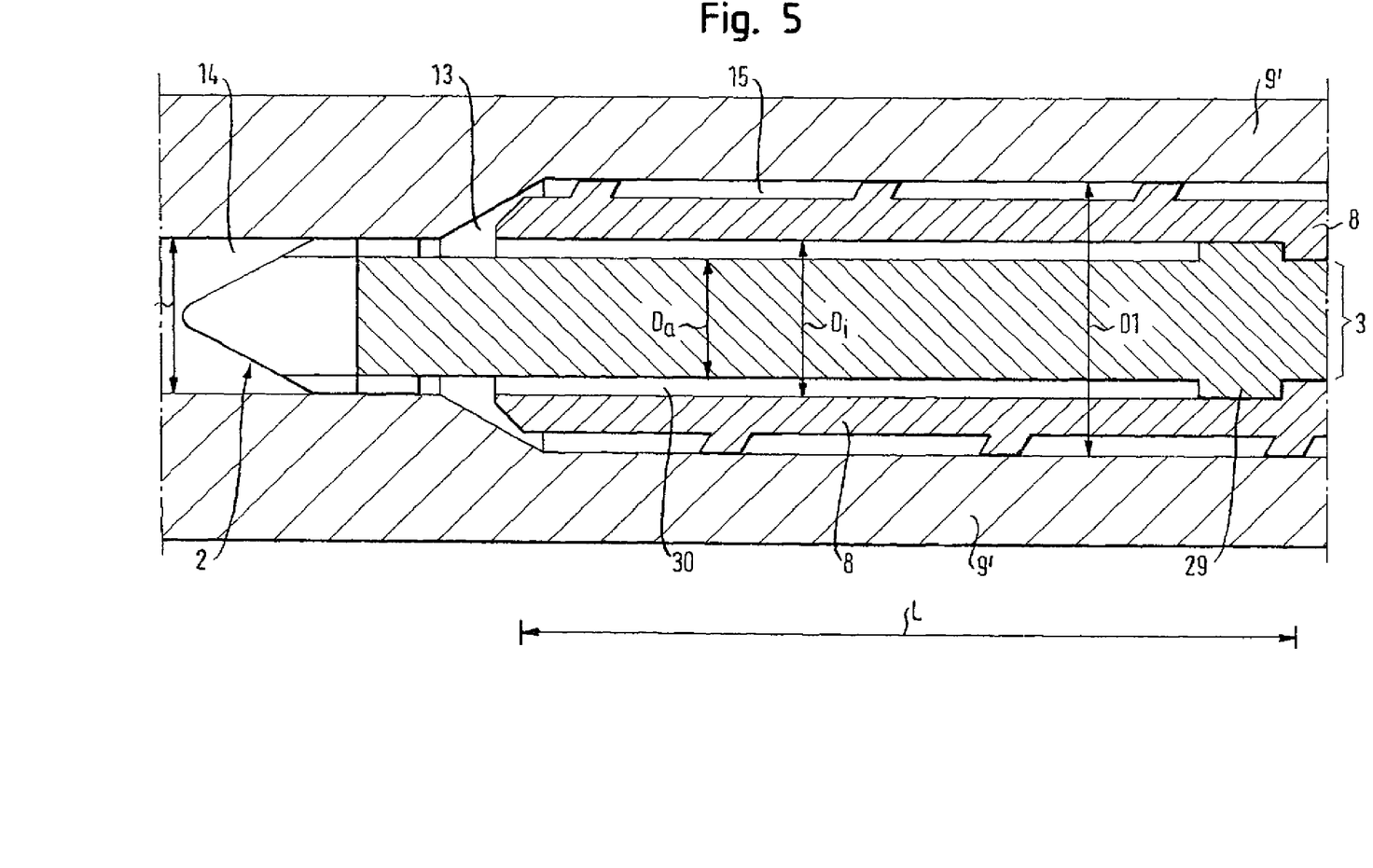
FIG. 5 shows a longitudinal section through embodiment according to FIG. 1, with modified plasticizing screw and modified injection plunger (injection plunger in rearward position=starting position)
Figure 6:
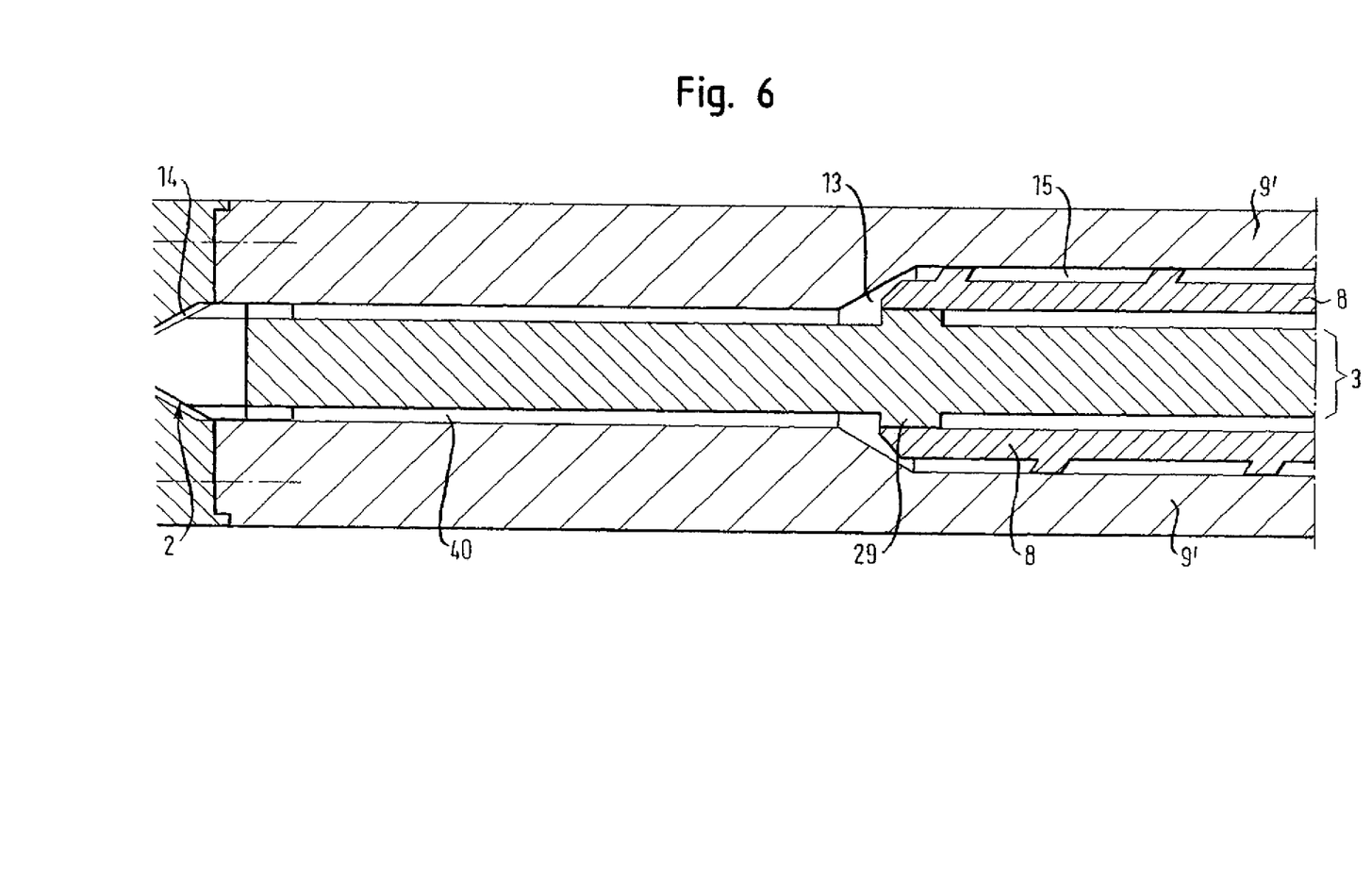
FIG. 6 like FIG. 5, however in a state after conclusion of injection (injection plunger in forward position=end position)
Figure 7:
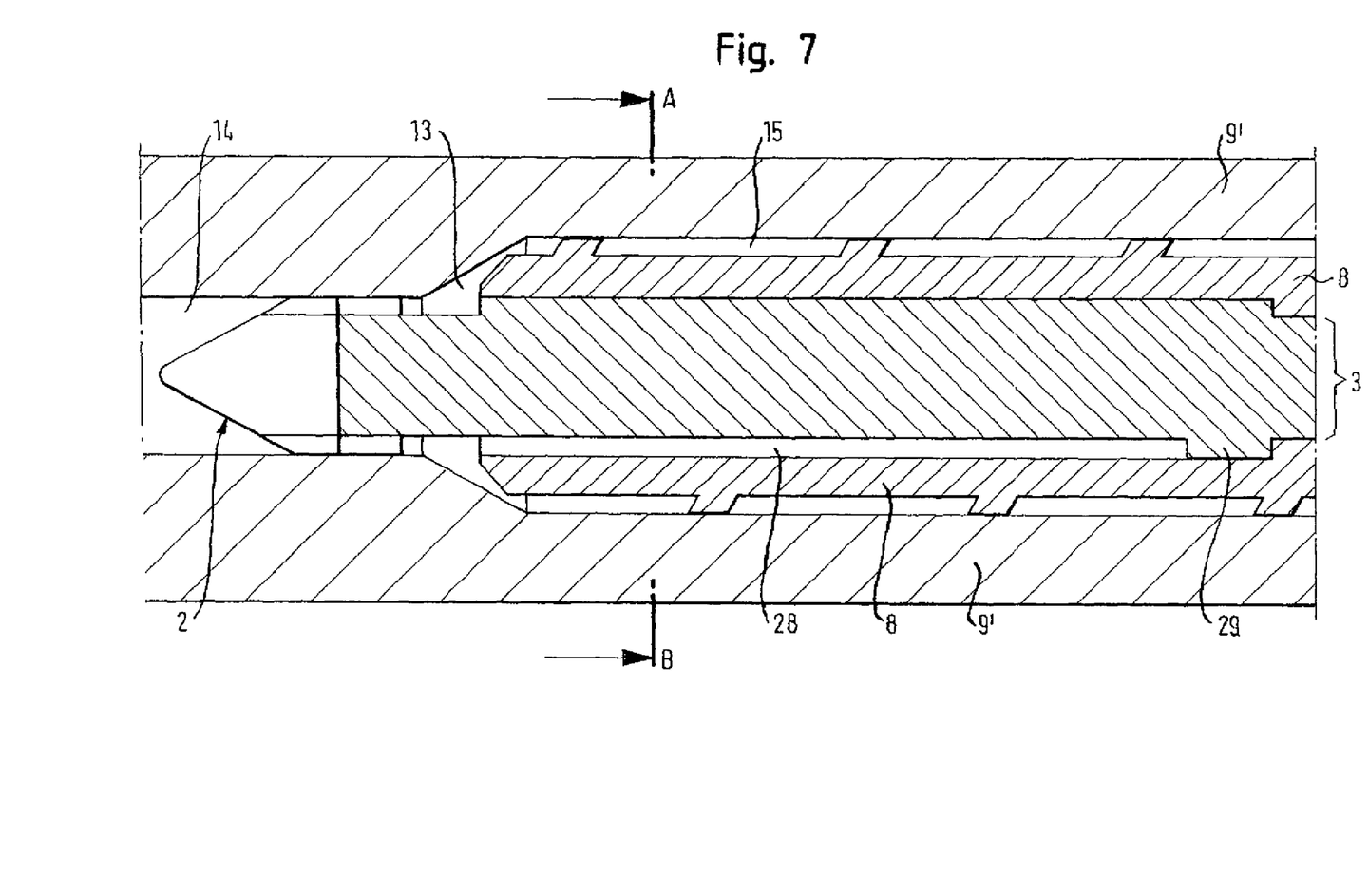
FIG. 7 shows an embodiment according to FIGS. 5 and 6 with modified injection plunger.
Figure 8:
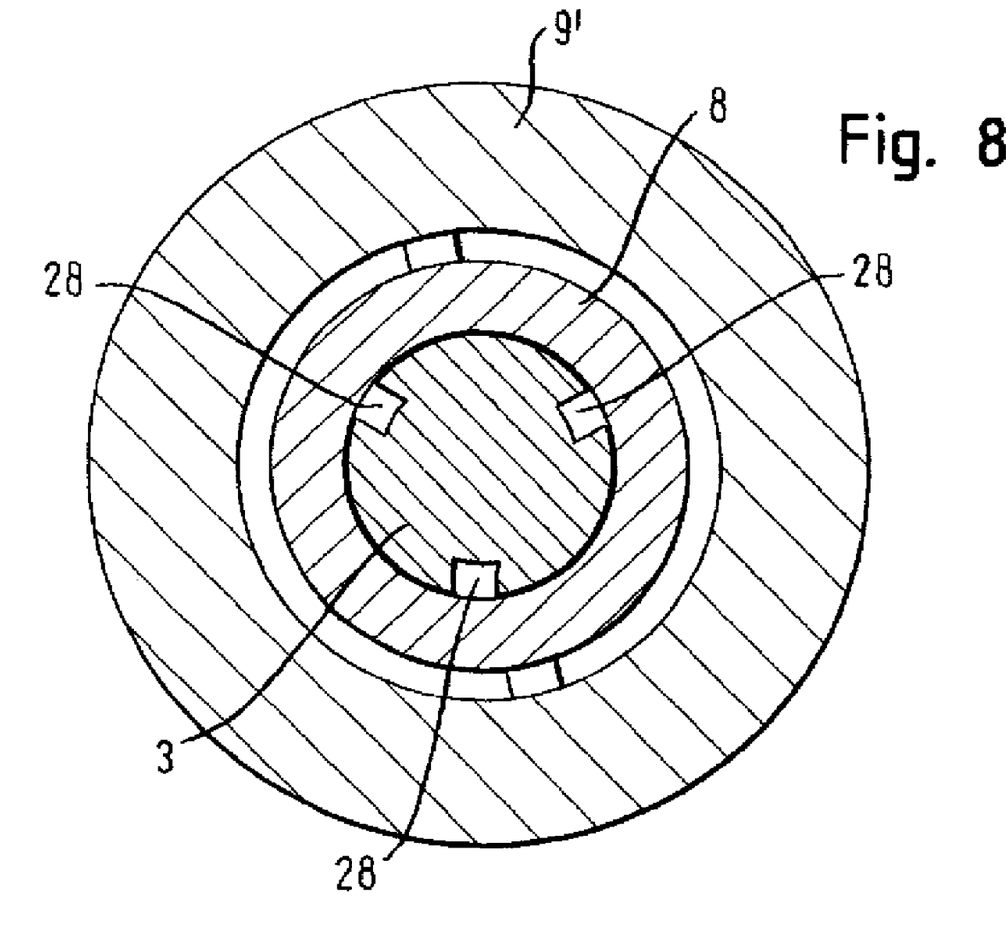
FIG. 8 shows a cross section along the line A-B in FIG. 7.

A further possibility to prevent decompression phenomena in the melt chamber 13 during the injection process is shown in FIGS. 5 and 6. The hollow-cylindrical plasticizing screw 8 has a length L of an inner diameter $D_i$ which is greater than the outer diameter $D_a$ of the injection plunger 3 so that an annular gap 30 is formed in this area and also filled with plastic melt during the metering process. In order to be able to displace this plastic melt during the injection process from the annular gap 30 and to move it forwards, the injection plunger 3 includes at a suitable site a portion 29 which operates as plunger and is widened to the inner diameter $D_i$ of the hollow-cylindrical plasticizing screw. The length and the width of the annular gap 30 are to be adjusted to the respective application at hand.

diameter corresponding to the inner diameter of the hollow-cylindrical plasticizing screw, i.e. $D_a = D_i$, when grooves 28 are provided on the outer side of the injection plunger for acceptance of plastic melt. The number of circumferentially spaced grooves 28, their shape and cross section as well as their axial length can be appropriately chosen by the artisan depending on the application at hand.

In contrast to the first exemplary embodiment, the plasticizing cylinder and the injection cylinder are configured in FIGS. 5 to 8 in the form of a single-piece cylinder 9'. Further, the rotation speed of the plasticizing screw can be optionally increased in the injection phase in the embodiments according to FIGS. 5 to 8 so as to increase the plasticizing capacity in the injection phase also in these embodiments.

The plasticizing and injection device according to the invention has the following advantages in combination:
a) a high plasticizing capacity by providing a plasticizing screw of suitably great diameter and/or a barrier screw, optionally with two or more screw flights,
b) a precise metering of the shot volume and a high injection pressure by providing an injection cylinder of comparably small diameter.

What is claimed is:

1. A plasticizing and injection device for a plastics processing machine, comprising:
   a plasticizing cylinder;
   a rotatable plasticizing screw arranged in the plasticizing cylinder in an axially immovable manner;
   an injection plunger arranged in the plasticizing screw (8) and having a forward end;
   a linear drive for moving the injection plunger back and forth in relation to the plasticizing screw;
   an injection cylinder positioned anteriorly of the plasticizing cylinder, and
   a non-return valve provided at the forward end of the injection plunger and movable back and forth by the injection plunger to execute an injection process within the injection cylinder between a rearward position at the start of the injection process and a forward position after conclusion of the injection process, wherein a melt chamber is formed between a forward end of the plasticizing screw and the non-return valve for formation of an annular gap between the injection plunger and the injection cylinder for accepting plastic melt during the injection process and during a holding pressure phase, while the plasticizing screw continues to rotate during the injection process.

2. The device of claim 1, wherein the plasticizing screw is configured in the form of a barrier screw.

3. The device of claim 1, wherein the plasticizing screw has at least one screw flight.

4. The device of claim 1, wherein the plasticizing screw is constructed as two- or three-flighted plasticizing screw.

5. The device of claim 1, wherein the injection plunger has a single-piece configuration.

6. The device of claim 1, wherein the injection plunger is constructed of multiple pieces in axial direction and/or radial direction in the absence of any relative movement between the pieces of the injection plunger.

7. The device of claim 1, wherein the plasticizing screw has a bore for accommodating the injection plunger, said injection plunger having an outer diameter which essentially corresponds along an entire length of the bore of the plasticizing screw to an inner diameter of the plasticizing screw such as to allow a displacement of the injection plunger in relation to the plasticizing screw.

8. The device of claim 1, wherein the plasticizing screw has a bore for accommodating the injection plunger, and further comprising a sliding and sealing sleeve provided at least at the forward end of the plasticizing screw in the bore of the plasticizing screw.

9. The device of claim 1, wherein the non-return valve is implemented as a member selected from the group consisting of annular non-return valve, ball-type non-return valve, slotted-guide-type non-return valve, and any combination thereof.

10. The device of claim 1, wherein the plasticizing screw has a bore for accommodating the injection plunger, said bore having a forward end of widened configuration defined by a diameter which is greater than an outer diameter of the injection plunger to thereby form an annular gap inside the plasticizing screw.

11. The device of claim 10, wherein the injection plunger has a plunger capable of sweeping over the annular gap.

12. The device of claim 1, wherein the injection plunger has at least one groove which extends over a length in the plasticizing screw, when the injection plunger assumes a retracted position.

13. The device of claim 12, wherein the grooves has cross section selected from the group consisting of U-shaped cross section, a rectangular, cross section, and triangular cross section, and extends substantially parallel to a length axis of the injection plunger.

14. The device of claim 1, wherein the linear drive is constructed as at least one double-acting hydraulic cylinder.

15. The device of claim 1, wherein at least one pressure pickup is arranged in at least one of the injection chamber and the melt chamber, and further comprising a control system operatively connected to the pressure pickup for controlling a rotation speed of the plasticizing screw in dependence on a signal of the pressure pickup.

16. The device of claim 15, wherein the control system is operated to increase the rotation speed of the plasticizing screw for compensating a decompression during the injection process.

* * * * *